United States Patent [19]
Knight et al.

[11] Patent Number: 5,435,494
[45] Date of Patent: * Jul. 25, 1995

[54] SPREADER APPARATUS FOR SPREADING MANURE

[75] Inventors: Stanley W. Knight; William M. Saunders, both of Brodhead; Ric S. Joranlien, Monroe, all of Wis.

[73] Assignee: Knight Manufacturing Corp., Brodhead, Wis.

[*] Notice: The portion of the term of this patent subsequent to Jan. 4, 2011 has been disclaimed.

[21] Appl. No.: 230,759

[22] Filed: Apr. 18, 1994

Related U.S. Application Data

[63] Continuation-in-part of Ser. No. 165,108, Dec. 10, 1993, Pat. No. 5,385,403, which is a continuation-in-part of Ser. No. 154,581, Nov. 18, 1993, Pat. No. 5,379,940, which is a continuation of Ser. No. 56,568, May 3, 1993, Pat. No. 5,275,335, which is a continuation of Ser. No. 831,835, Feb. 6, 1992, abandoned.

[51] Int. Cl.$^6$ ............................................. A01C 15/00
[52] U.S. Cl. ................................... 239/675; 239/683; 366/297; 366/320; 366/603
[58] Field of Search ........ 239/675, 683, 672, 679–681; 366/603, 297, 329, 300, 186

[56] References Cited

U.S. PATENT DOCUMENTS

| | | | |
|---|---|---|---|
| 531,206 | 12/1894 | Merrell | 239/667 |
| 3,037,780 | 6/1962 | Skronne et al. | 239/670 |
| 3,084,942 | 4/1963 | Kucera | 239/658 |
| 3,090,605 | 5/1963 | Copeland et al. | 366/298 |
| 3,155,288 | 11/1964 | Landgraf | 222/227 |
| 3,303,917 | 2/1967 | Wilkes et al. | 361/106 |
| 3,420,452 | 1/1969 | Vaughan | 239/670 |
| 3,478,970 | 11/1969 | Siwersson et al. | 239/687 |

(List continued on next page.)

FOREIGN PATENT DOCUMENTS

| | | | |
|---|---|---|---|
| 0061436 | 9/1982 | European Pat. Off. | 239/675 |
| 729227 | 11/1942 | Germany | 366/186 |
| 2028151 | 3/1980 | United Kingdom | 366/603 |
| 2030463 | 4/1980 | United Kingdom | 366/300 |
| 2173682 | 10/1986 | United Kingdom | 239/679 |

OTHER PUBLICATIONS

Slinger 700 Series Ref. 5204/201C/3P/1090, Pub. 1990, Knight Manufacturing Corp., Brodhead, Wis.
Slinger Sludge and Organic Waste Applicator, Ref. 5205/20KIP/0887, Pub. 1987, Knight Industrial Division, Brodhead, Wis.
Gehl Trade Publication No. 4424–286–107, Pub. 1986.
New Idea "Solids II Plus Spreaders", Form FH87–320, Pub. 1987.
H&S Trade Publication "U–Twin", Pub. 1988. Jul.
Rex Souper Spreader Trade Publication, Pub. 1984.
K&K "Big John" Trade Publication.

*Primary Examiner*—Karen B. Merritt
*Attorney, Agent, or Firm*—David J. Archer

[57] ABSTRACT

A spreader apparatus is disclosed for spreading manure. The apparatus includes a container which defines an opening for the reception therein of the manure. The container also defines an outlet for the discharge therethrough of the manure. A rotatable feed auger is disposed within and co-operates with the container for feeding the manure through the container. The feed auger has an axis of rotation which extends through the container. A rotatable discharge auger is disposed within the container and co-operates with the container and the feed auger for moving the manure towards the outlet. The discharge auger has a further axis of rotation which is disposed spaced and parallel to and laterally below the axis of rotation of the feed auger. The arrangement is such that when the feed auger and the discharge auger are rotating, the manure is fed by the feed auger from the feed auger to the discharge auger even when the level of the manure drops below the level of the discharge auger so that all of the manure within the container is fed at a substantially constant rate towards the outlet. The spreader apparatus also includes an expeller for expelling the manure through the outlet.

51 Claims, 4 Drawing Sheets

U.S. PATENT DOCUMENTS

| | | | |
|---|---|---|---|
| 3,706,442 | 12/1972 | Peat | 366/186 |
| 3,797,807 | 3/1974 | Behrens | 366/186 |
| 3,995,836 | 12/1976 | Carter et al. | 366/603 |
| 3,997,118 | 12/1976 | Bedwell et al. | 239/675 |
| 4,185,782 | 1/1980 | Belrose | 239/663 |
| 4,206,841 | 6/1980 | Lundgren | 198/670 |
| 4,234,109 | 11/1980 | Goodhart | 239/662 |
| 4,362,272 | 12/1982 | Martin | 239/7 |
| 4,467,967 | 8/1984 | Martin | 239/662 |
| 4,473,184 | 9/1984 | Martin | 239/7 |
| 4,475,692 | 10/1984 | Walley | 239/662 |
| 4,480,927 | 11/1984 | Peat et al. | 366/603 |
| 4,528,098 | 7/1985 | Treysaac et al. | 210/414 |
| 4,720,047 | 1/1988 | Knight et al. | 239/675 |
| 4,752,139 | 6/1988 | Hauck | 366/300 |
| 5,199,638 | 4/1993 | Fischer | 239/675 |

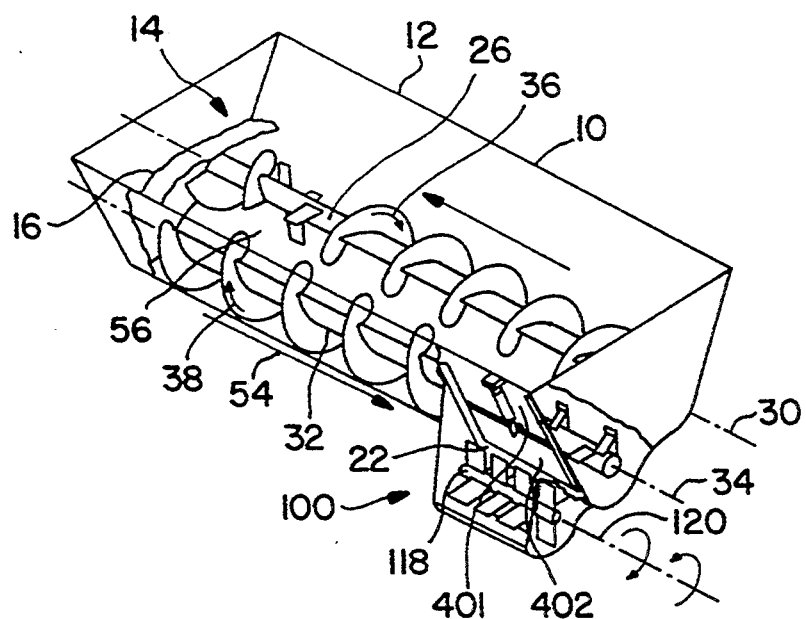
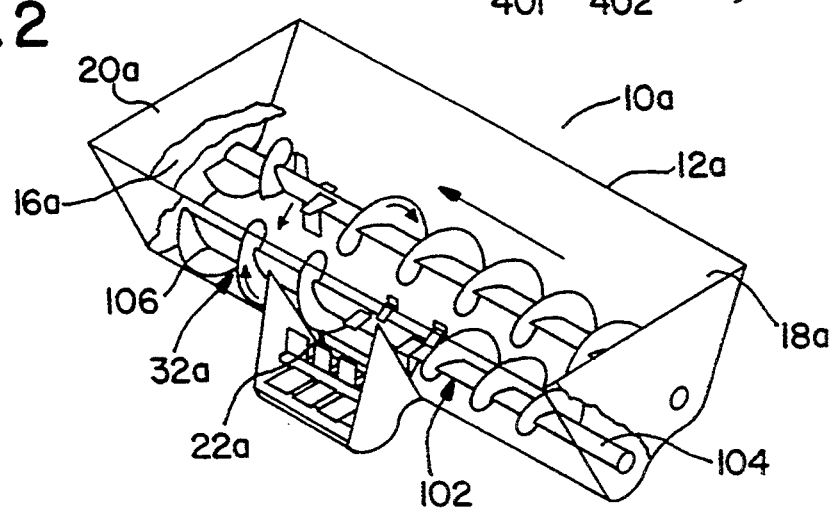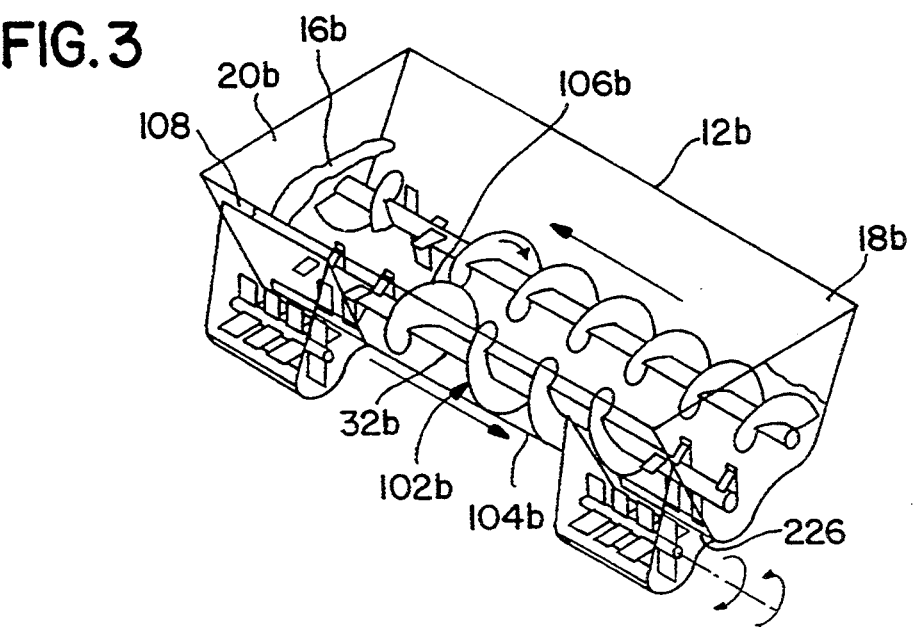

SPREADER APPARATUS FOR SPREADING MANURE

CROSS REFERENCE TO RELATED APPLICATIONS

The present invention is a continuation-in-part of U.S. Patent No. 5,385,403, filed Dec. 10th, 1993, which is a continuation-in-part of U.S. Patent No. 5,379,940, filed November 18th, 1993, which is a continuation of U.S. Patent No. 5,175,335, filed May 3rd, 1993, which is a continuation of U.S. Serial No. 07/831,835, filed February 6th, 1992, now abandoned. All the disclosure of the aforementioned U.S. Patents and applications are incorporated herein by reference.

BACKGROUND OF THE INVENTION

FIELD OF THE INVENTION

The present invention relates to a spreader apparatus for spreading manure, seed, crop residue, compost, straw, bark, dirt or the like.

INFORMATION DISCLOSURE STATEMENT

The present invention relates to several variations and improvements of the manure spreader disclosed in U.S. Pat. No. 5,275,335 and the aforementioned patents and application the disclosures of which are incorporated herein by reference.

The aforementioned Patents and applications and particularly U.S. Pat. No. 5,275,335 describe a spreader apparatus for spreading manure. The spreader apparatus includes a container having an opening for the reception therein of the manure and an outlet for the discharge therethrough of the manure.

Additionally, the apparatus includes a rotatable feed means which is disposed within and co-operates with the container for feeding the manure through the container. The feed means has an axis of rotation which extends through the container.

Also, the spreader apparatus includes a rotatable discharge means having a further axis of rotation disposed spaced and substantially parallel to and laterally below the axis of rotation of the feed means.

An important feature of the aforementioned invention is that when the manure is fed by the feed means from the feed means to the discharge means, such is attained even when the level of the manure drops below the top of the discharge means so that all the manure within the container is fed at a substantially constant rate towards the outlet.

The present invention includes an arrangement in which the outlet is disposed midway between the first and the second end zones of the container.

In another embodiment of the present invention, the container defines an outlet and a further outlet. The outlets are disposed respectively adjacent to the end zones of the container.

Additionally, the present invention includes an expeller means which is positioned in one embodiment of the present invention such that manure is spread simultaneously towards a first and second parallel row of trees such as in an orchard or the like.

In one embodiment of the present invention the expeller means includes a driven shaft which has an axis of rotation which is disposed substantially horizontally and in another embodiment of the present invention the driven shaft is disposed substantially vertically.

Additionally, the present invention envisages arrangements in which both the feed means and the discharge means have axes of rotation disposed spaced and substantially parallel relative to each other and at either the same elevation or with the axis of rotation of the feed means being below the further axis of rotation of the discharge means. The diameter of the feed means may be less than the diameter of the discharge means so that when the manure drops below the top of the discharge means, all the manure within the container is fed at a substantially constant rate towards the outlet.

Therefore, it is a primary objective of the present invention to provide an arrangement which is a variation and modification of the invention disclosed particularly but not exclusively in U.S. Pat. No. 5,275,335.

SUMMARY OF THE INVENTION

The present invention relates to a spreader apparatus for spreading manure. The apparatus includes a container which defines an opening for the reception therein of the manure. The container also defines an outlet for the discharge therethrough of the manure. A rotatable feed means is disposed within and co-operates with the container for feeding the manure through the container. The feed means has an axis of rotation which extends through the container. A rotatable discharge means is disposed within the container and co-operates with the container and the feed means for moving the manure towards the outlet. The discharge means has a further axis of rotation which is disposed spaced and parallel to and laterally below the axis of rotation of the feed means. The arrangement is such that when the feed means and the discharge means are rotating, the manure is fed by the feed means from the feed means to the discharge means even when the level of the manure drops below the top of the discharge means so that all the manure within the container is fed at a substantially constant rate towards the outlet. The spreader apparatus also includes expeller means which are disposed adjacent to the outlet for expelling the manure from the container through the outlet.

In a more specific embodiment of the present invention, the container includes a first and a second end zone with the outlet being disposed substantially midway between the first and second end zones.

More specifically, the discharge means includes a helical auger means or individual paddles arranged in a helical configuration for feeding the manure towards the outlet. The helical means includes a first portion for feeding the manure from the first end zone towards the outlet. The helical means also includes a second portion for feeding the manure from the second end zone towards the outlet.

In another embodiment of the present invention, the container includes a first and a second end zone with the outlet being disposed adjacent to the first end zone. A further outlet is disposed adjacent to the second end zone. The discharge means includes a helical means for feeding the manure towards the outlets. The helical means includes a first portion for feeding the manure towards the outlet and a second portion for feeding the manure towards the further outlet.

In one embodiment of the present invention, the expeller means is positioned such that the manure moving through the outlet is expelled by the expeller means laterally in opposite directions so that when the apparatus moves between a first and a second row of trees disposed parallel relative to each other, the manure is expelled by the expeller means towards both rows of trees.

In one embodiment of the present invention, the expeller means includes a driven shaft having an axis of rotation disposed substantially horizontally. More specifically, the expeller means further includes a plurality of hammers with each hammer being pivotally secured to the driven shaft.

In another embodiment of the present invention, the axis of rotation of the driven shaft of the expeller, that is the auxilliary shaft extends angularly relative to the further axis.

In yet another embodiment of the present invention, the axis of rotation of the expeller driven shaft extends normally to the further axis.

In still another embodiment of the present invention, the axis of rotation of the expeller driven shaft extends parallel to the further axis.

Additionally, the present invention includes an arrangement in which the expeller has multiple driven shafts with axes disposed parallel & vertical or horizontal & with fixed or pivotally attached hammers thereon.

Also, in one embodiment of the present invention, the expeller means includes a driven shaft having a rotational axis disposed substantially vertically.

In yet another variation of the present invention, a spreader apparatus for spreading manure includes a container which defines an opening for the reception therein of the manure. The container also includes an outlet for the discharge therethrough of the manure. A rotatable feed means is disposed within and co-operates with the container for feeding the manure through the container. The feed means has an axis of rotation which extends through the container.

A rotatable discharge means is disposed within the container and co-operates with the container and the feed means for moving the manure towards the outlet. The discharge means has a further axis of rotation which is disposed spaced and substantially parallel to and at the same elevation or at a higher elevation relative to the axis of rotation of the feed means.

The feed means may have a diameter which is less than the diameter of the discharge means. The arrangement is such that when the feed means and the discharge means are rotating, the manure is fed by the feed means from the feed means to the discharge means even when the level of the manure drops below the top of the discharge means so that all the manure within the container is fed at a substantially constant rate towards the outlet.

The spreader apparatus additionally includes expeller means disposed adjacent to the outlet for expelling the manure from the container through the outlet.

In a preferred embodiment of the present invention, the outlet has closure means such as a vertically movable door which co-operates with the outlet for selectively closing the outlet such that when the outlet is closed by the closure means, the manure recirculates through the container. The arrangement is such that bridging is inhibited so that overflowing of the manure from the container is avoided.

Many modifications and variations of the present invention will be readily apparent to those skilled in the art by a consideration of the detailed description contained hereinafter taken in conjunction with the annexed drawings. However, such variations and modifications fall within the spirit and the scope of the present invention as defined by the appended claims.

Additionally, the auger flighting may be of the ribbon type or alternatively of continuous structure extending spirally from a central shaft. Also, the auger flighting may be replaced by individual paddles or vanes.

Similarly, the expeller may be of the paddle type construction as shown in FIG. 3 or a vertical beater as shown in FIG. 7.

BRIEF DESCRIPTION OF THE DRAWINGS

FIG. 1 is a perspective view of a first embodiment of the present invention showing the expeller means having an axis of rotation disposed parallel to the axis of rotation of the discharge means;

FIG. 2 is a perspective view of a second embodiment of the present invention in which the outlet is disposed midway between the first and the second end zones;

FIG. 3 is a perspective view of a third embodiment of the present invention in which the outlet is disposed adjacent to the first end zone and a further outlet is disposed adjacent to the second end zone;

FIG. 4 is a perspective view of a fourth embodiment of the present invention in which manure is fed laterally on either side of the container and is particularly useful for spreading manure in an orchard or the like;

Similar reference characters refer to similar parts throughout the various embodiments shown in the drawings.

DETAILED DESCRIPTION OF THE DRAWINGS

Figure 4:
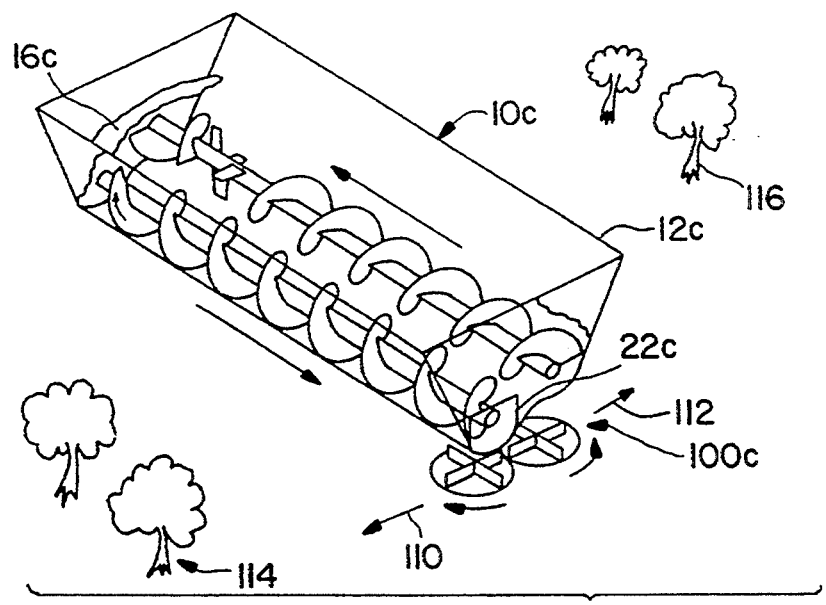

FIG. 1 is a perspective view of a spreader apparatus generally designated 10 for spreading manure. The apparatus 10 includes a container 12 which defines an opening 14 for the reception therein of the manure 16. The container 12 also defines an outlet 22 for the discharge therethrough of the manure 16.

A rotatable feed means 26 is disposed within and cooperates with the container 12 for feeding the manure 16 through the container 12. The feed means 26 has an axis of rotation 30 which extends through the container 12.

A rotatable discharge means 32 is disposed within the container 12 and co-operates with the container 12 and the feed means 26 for moving the manure 16 towards the outlet 22 as indicated by the arrow 54. The discharge means 32 has a further axis of rotation 34 which is disposed spaced and parallel to and laterally below the axis of rotation 30 of the feed means 26. The arrangement is such that when the feed means 26 and the discharge means 32 are rotating as indicated by the arrows 36 and 38 respectively, the manure 16 is fed as indicated by the arrow 56 by the feed means 26 from the feed means 26 to the discharge means 32 even when the level of the manure 16 drops below the top of the discharge means 32 so that all the manure 16 within the container 12 is fed at a substantially constant rate towards the outlet 22.

The spreader apparatus 10 also includes expeller means generally designated 100 disposed adjacent to the outlet 22 for expelling the manure 16 from the container 12 through the outlet 22.

FIG. 2 is a perspective view of a spreader apparatus 10a according to a further embodiment of the present invention in which the container 12a includes a first and a second end zone 18a and 20a respectively. The outlet 22a is disposed substantially midway between the first and the second end zone 18a and 20a.

More specifically, the discharge means 32a includes helical auger means 102 for feeding the manure 16a towards the outlet 22a. The auger means 102 also includes a first portion 104 for feeding the manure 16a from the first end zone 18a towards the outlet 22a and a second portion 106 for feeding the manure 16a from the second end zone 20a towards the outlet 22a.

FIG. 3 is a perspective view of another embodiment of the present invention in which the container 12b includes a first and second end zone 18b,20b respectively. The outlet 22b is disposed adjacent to the first end zone 18b. A further outlet 108 is disposed adjacent to the second end zone 20b. The discharge means 32b includes helical auger means 102b for feeding the manure 16b towards the outlets 22b,108 respectively.

The auger means 102b includes a first portion 104b for feeding the manure 16b towards the outlet 22b and a second portion 106b for feeding the manure towards the further outlet 108.

FIG. 4 is a perspective view of yet another embodiment of the present invention wherein the spreader apparatus 10c includes an expeller means generally designated 100c positioned such that the manure 16c moving through the outlet 22c is expelled by the expeller means 100c laterally in opposite directions as indicated by the arrows 110 and 112. The manure 16c is expelled laterally from the container 12c so that when the apparatus 10c moves between a first and second row of trees 114 and 116 disposed parallel relative to each other, the manure 16c is expelled by the expeller means 100c towards both rows of trees 114 and 116 respectively.

As shown in FIG. 1, the expeller means 100 includes a driven shaft 118 having an axis of rotation 120 disposed substantially horizontally.

Figure 5:
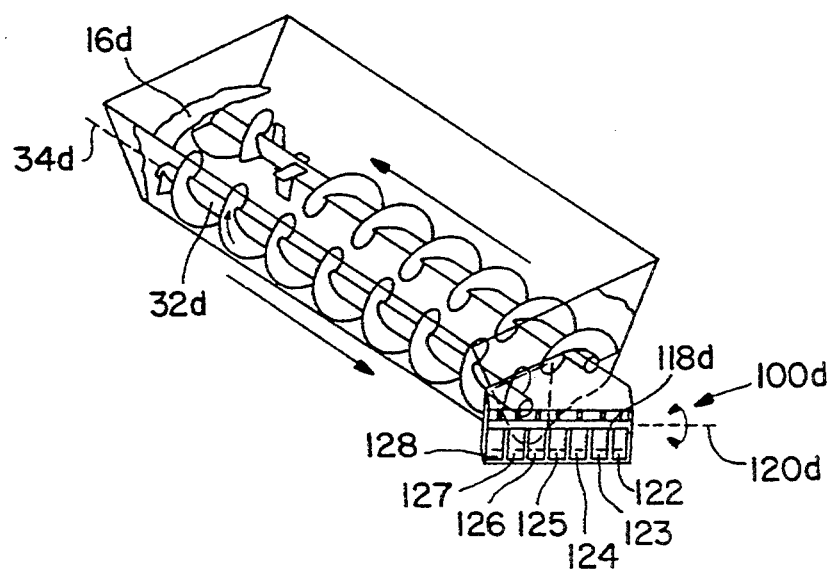
FIG. 5 is a perspective view of a fifth embodiment of the present invention in which the rotational axis of the expeller means is horizontal but angularly disposed relative to the further axis of the discharge means.

FIG. 5 is a perspective view of another embodiment of the present invention similar to that shown in FIG. 1 but wherein the expeller means 100d further includes a plurality of hammers 122,123,124,125,126,127 and 128 pivotally secured to the driven shaft 118d.

Additionally, in FIG. 5, the axis of rotation 120d of the driven shaft 118d extends angularly relative to the further axis 34d of the discharge means 32d.

Figure 6:
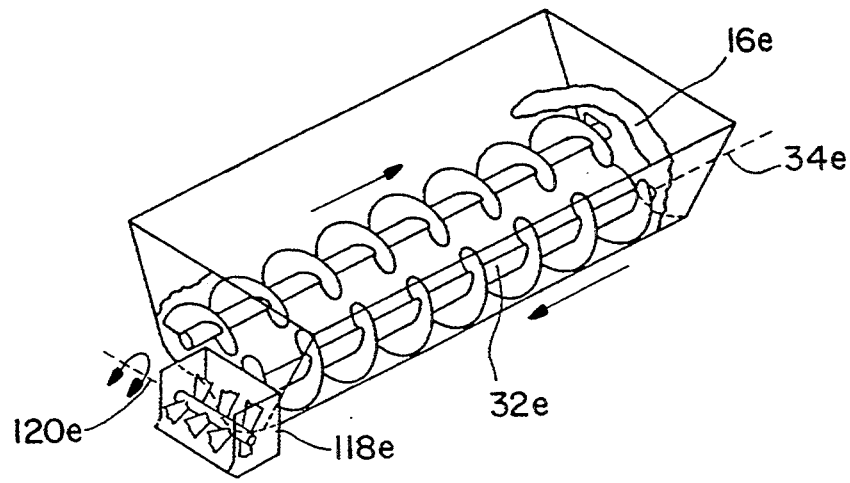
FIG. 6 is a perspective view of a sixth embodiment of the present invention in which the axis of rotation of the expeller means is disposed substantially normally to the further axis of the discharge means.

FIG. 6 shows another embodiment of the present invention in which the axis of rotation 120e of the driven shaft 118e extends normally to the further axis 34e of the discharge means 32e.

In the embodiment shown in FIG. 1, the axis of rotation 120 of the driven shaft 118 extends parallel to the further axis 34 of the discharge means 32.

Figure 7:
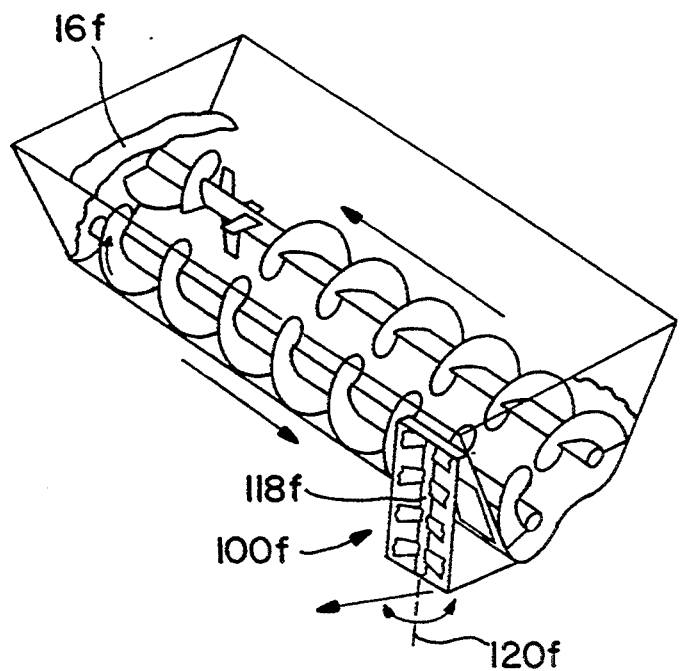
FIG. 7 is a perspective view of a seventh embodiment of the present invention in which the axis of rotation of the driven shaft of the expeller means is disposed substantially vertically.

FIG. 7 is a perspective view of yet another embodiment of the present invention in which the expeller means 100f includes a driven shaft 118f having a rotational axis 120f disposed substantially vertically.

Figure 8:
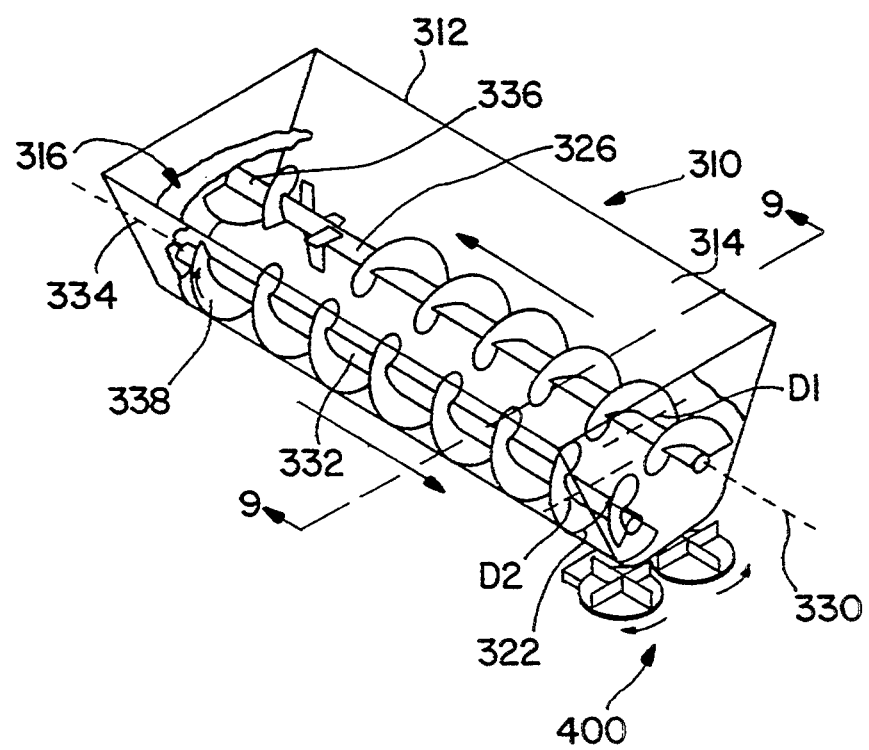
FIG. 8 is a perspective view of yet another embodiment of the present invention in which the feed means and the discharge means are disposed at the same elevation but have different diameters.

Another embodiment of the present invention is shown in FIG. 8 which is a perspective view of yet another spreader apparatus 310 according to the present invention for spreading manure 316. The apparatus 310 includes a container 312 which defines an opening 314 for the reception therein of the manure 316. The container 312 also defines an outlet 322 for the discharge therethrough of the manure 316.

A rotatable feed means 326 is disposed within and co-operates with the container 312 for feeding the manure 316 through the container 312. The feed means 326 has an axis of rotation 330 which extends through the container 312.

A rotatable discharge means 332 is disposed within the container 312 and co-operates with the container 312 and the feed means 326 for moving the manure 316 towards the outlet 322. The discharge means 332 has a further axis of rotation 334 which is disposed spaced and parallel to and at the same elevation as the axis of rotation 330 of the feed means 326. The feed means 326 has a diameter D1 which is less than the diameter D2 of the discharge means 332. The arrangement is such that when the feed means 326 and the discharge means 332 are rotating as indicated by the arrows 336 and 338 respectively, the manure 316 is fed by the feed means 326 from the feed means 326 to the discharge means 332 even when the level of the manure 316 drops below the top of the discharge means 332 so that all the manure 316 within the container 312 is fed at substantially a constant rate towards the outlet 322.

Expeller means 400 are disposed adjacent to the outlet 322 for expelling the manure 316 from the container 312 through the outlet 322.

Figure 9:
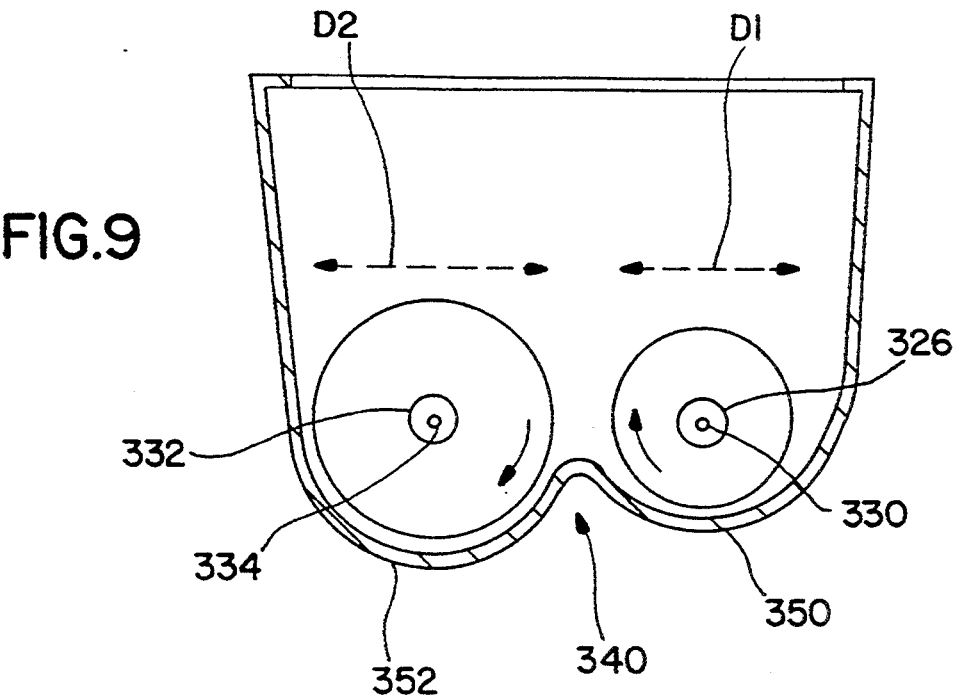
FIG. 9 is a sectional view taken on the line 9—9 of FIG. 8 and shows the axis and further axis disposed at the same elevation but the feed means having a smaller diameter than the diameter of the discharge means.

FIG. 9 is a sectional view taken on the line 9—9 of FIG. 8 and shows the axis 330 and further axis 334 at the same elevation. Nevertheless, a first portion 350 of the base 340 is disposed at a higher elevation than the elevation of a second portion 352 of the base 340.

Figure 10:
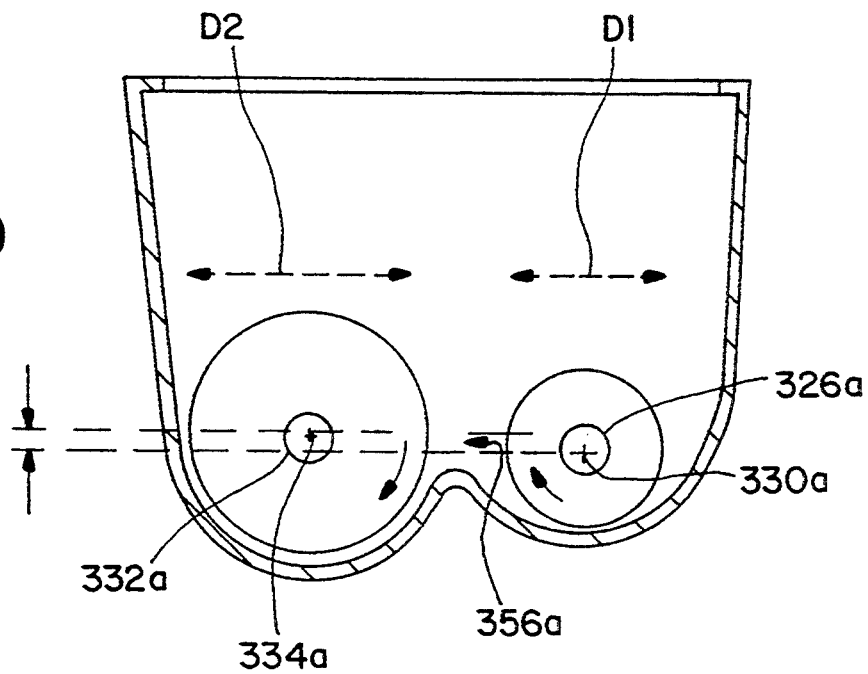
FIG. 10 is a similar view to that shown in FIG. 9 but shows a further embodiment of the present invention in which the feed means has a smaller diameter than the diameter of the discharge means and in which the axis of the feed means is disposed below the further axis of the discharge means.

FIG. 10 is a similar view to that shown in FIG. 9 but shows another embodiment of the present invention in which the diameter D1 of the feed means 326A is less than the diameter D2 of the discharge means 332A so that the axis 330A of the feed means 326A is below the further axis 334A of the discharge means 332A. The arrangement still permits a radial component indicated by the arrow 356A generated by the feed means 326A to fill voids in the manure being moved by the discharge means 334A particularly when only a residue of the manure remains within the container.

As is well known in the art, the hammers may be pivotally secured to an extension welded onto the driven shaft as shown in FIG. 5. Alternatively, as shown in FIG. 3, the hammers may be rigidly secured to the driven shaft.

In a preferred embodiment of the present invention, the outlet has closure means 401 such as a vertically movable door 402 which co-operates with the outlet 22 for selectively closing the outlet 22 such that when the outlet 22 is closed by the closure means 401, the manure recirculates through the container 12. The arrangement is such that bridging is inhibited so that overflowing of manure from the container 12 is avoided.

More specifically, when the closure means 401 closes the outlet 22, for example when the operator is driving to the field on which the manure is to be spread, the manure recirculates. Also, because the present invention overcomes the problem of bridging, the manure will not become backed up by any bridged manure, therefore, the manure will not overspill the sides of the container.

The aforementioned feature has been found to be particularly useful when applying manure to a field because when the operator turns at the end of the field to make a return pass, the operator closes the door 402 while leaving the power take off (PTO) to the spreader running. In this manner manure is applied where needed and spillage is avoided.

The aforementioned variants have in common the feature that when the level of the material within the container drops below the top of the discharge means, the feed means is still able to feed the material towards the discharge means. In fact, as voids occur in the discharge means due to the level of the material dropping below the top of the discharge means, there exists a tendency in each of the aforementioned embodiments for the material to be fed radially from the feed means into the discharge means without any need for the material to be fed by the feed means towards one or other of the end zones. By this means, the present invention provides a simple means for feeding the material within the container at a substantially constant rate towards the outlet even when the amount of material within the container drops below the top of the discharge means.

What is claimed is:

1. A spreader apparatus for spreading manure, said apparatus comprising:
   a container defining an opening for the reception therein of the manure, said container also defining an outlet means for the discharge therethrough of the manure;
   a rotatable feed means disposed within and co-operating with said container for feeding the manure through said container, said feed means having an axis of rotation which extends through said container;
   a rotatable discharge means disposed within said container and co-operating with said container and said feed means for moving the manure towards said outlet means, said discharge means having a further axis of rotation which is disposed spaced and parallel to and laterally below said axis of rotation of said feed means, the arrangement being such that when said feed means and said discharge means are rotating, the manure is fed by said feed means from said feed means to said discharge means even when the level of the manure drops below the top of said discharge means so that all of the manure within the container is fed at a substantially constant rate towards said outlet means and expeller means disposed adjacent to said outlet means for expelling the manure from said container through said outlet means.

2. A spreader apparatus as set forth in claim 1 wherein said container includes:
   a first and a second end zone, said outlet means being disposed substantially midway between said first and second end zones.

3. A spreader apparatus as set forth in claim 2 wherein said discharge means includes:
   helical auger means for feeding the manure towards said outlet means;
   said auger means including:
   a first portion for feeding the manure from said first end zone towards said outlet means;
   a second portion for feeding the manure from said second end zone towards said outlet means.

4. A spreader apparatus as set forth in claim 1 wherein said outlet means includes:
   an outlet and a further outlet;
   said container including:
   a first and second end zone, said outlet being disposed adjacent to said first end zone;
   said further outlet being disposed adjacent to said second end zone.

5. A spreader apparatus as set forth in claim 4 wherein said discharge means includes:
   helical auger means for feeding the manure towards said outlets;
   said auger means including:
   a first portion for feeding the manure towards said outlet;
   a second portion for feeding the manure towards said further outlet.

6. A spreader apparatus as set forth in claim 4 further including:
   a further expeller means disposed adjacent to said further outlet for expelling the manure from said container through said further outlet.

7. A spreader apparatus as set forth in claim 1 wherein said expeller means is positioned such that the manure moving through said outlet means is expelled by said expeller means laterally in opposite directions from said container so that when said apparatus moves between a first and a second row of trees disposed parallel relative to each other, the manure is expelled by said expeller means towards both rows of trees.

8. A spreader apparatus as set forth in claim 1 wherein said expeller means includes:
   a driven shaft having an axis of rotation disposed substantially horizontally.

9. A spreader apparatus as set forth in claim 8 wherein said expeller means further includes:
   a further driven shaft having a further rotational axis disposed substantially parallel to said axis of said driven shaft.

10. A spreader apparatus as set forth in claim 8 wherein said expeller means further includes:
    a plurality of hammers, each hammer being pivotally secured to said driven shaft.

11. A spreader apparatus as set forth in claim 8 wherein said expeller further includes:
    a plurality of fixed hammers, each hammer being rigidly secured said driven shaft.

12. A spreader apparatus as set forth in claim 8 wherein said axis of rotation of said driven shaft extends angularly relative to said further axis.

13. A spreader apparatus as set forth in claim 8 wherein said axis of rotation of said driven shaft extends normally to said further axis.

14. A spreader apparatus as set forth in claim 8 wherein said axis of rotation of said driven shaft extends parallel to said further axis.

15. A spreader apparatus as set forth in claim 1 wherein said expeller means includes:

a driven shaft having a rotational axis disposed substantially vertically.

16. A spreader apparatus as set forth in claim 15 wherein said expeller means further includes:
a further driven shaft having a rotational axis disposed substantially parallel to said rotational axis of said driven shaft.

17. A spreader apparatus as set forth in claim 1 further including:
closure means co-operating with said outlet means for selectively closing said outlet means such that when said outlet means is closed by said closure means, the manure recirculates through said container, the arrangement being such that bridging is inhibited and also overflowing of manure from said container is avoided.

18. A spreader apparatus for spreading manure, said apparatus comprising:
a container defining an opening for the reception therein of the manure, said container also defining an outlet means for the discharge therethrough of the manure;
a rotatable feed means disposed within and cooperating with said container for feeding the manure through said container, said feed means having an axis of rotation which extends through said container;
a rotatable discharge means disposed within said container and co-operating with said container and said feed means for moving the manure towards said outlet means, said discharge means having a further axis of rotation which is disposed spaced and parallel to and at a same elevation as said axis of rotation of said feed means;
said feed means having a diameter which is less than a diameter of said discharge means, the arrangement being such that when said feed means and said discharge means are rotating, the manure is fed by said feed means from said feed means to said discharge means even when the level of the manure drops below the top of said discharge means so that all the manure within said container is fed at a substantially constant rate towards said outlet means; and
expeller means disposed adjacent to said outlet means for expelling the manure from said container through said outlet means.

19. A spreader apparatus as set forth in claim 18 wherein said container includes:
a first and a second end zone, said outlet means being disposed substantially midway between said first and second end zones.

20. A spreader apparatus as set forth in claim 19 wherein said discharge means includes:
helical auger means for feeding the manure towards said outlet means;
said auger means including:
a first portion for feeding the manure from said first end zone towards said outlet;
a second portion for feeding the manure from said second end zone towards said outlet means.

21. A spreader apparatus as set forth in claim 18 wherein said outlet means includes:
an outlet and a further outlet;
said container including:
a first and second end zone, said outlet being disposed adjacent to said first end zone;
said further outlet being disposed adjacent to said second end zone.

22. A spreader apparatus as set forth in claim 21 wherein said discharge means includes:
helical auger means for feeding the manure towards said outlets;
said auger means including:
a first portion for feeding the manure towards said outlet;
a second portion for feeding the manure towards said further outlet.

23. A spreader apparatus as set forth in claim 21 further including:
a further expeller means disposed adjacent to said further outlet for expelling the manure from said container through said further outlet.

24. A spreader apparatus as set forth in claim 18 wherein said expeller means is positioned such that the manure moving through said outlet means is expelled by said expeller means laterally in opposite directions from said container so that when said apparatus moves between a first and a second row of trees disposed parallel relative to each other, the manure is expelled by said expeller means towards both rows of trees.

25. A spreader apparatus as set forth in claim 18 wherein said expeller means includes:
a driven shaft having an axis of rotation disposed substantially horizontally.

26. A spreader apparatus as set forth in claim 25 wherein said expeller means further includes:
a further driven shaft having a further rotational axis disposed substantially parallel to said axis of said driven shaft.

27. A spreader apparatus as set forth in claim 25 wherein said expeller means further includes:
a plurality of hammers, each hammer being pivotally secured to said driven shaft.

28. A spreader apparatus as set forth in claim 25 wherein said expeller further includes:
a plurality of fixed hammers, each hammer being rigidly secured to said driven shaft.

29. A spreader apparatus as set forth in claim 25 wherein said axis of rotation of said driven shaft extends angularly relative to said further axis.

30. A spreader apparatus as set forth in claim 25 wherein said axis of rotation of said driven shaft extends normally to said further axis.

31. A spreader apparatus as set forth in claim 25 wherein said axis of rotation of said driven shaft extends parallel to said further axis.

32. A spreader apparatus as set forth in clam 18 wherein said expeller means includes:
a driven shaft having a rotational axis disposed substantially vertically.

33. A spreader apparatus as set forth in claim 32 wherein said expeller means further includes:
a further driven shaft having a rotational axis disposed substantially parallel to said rotational axis of said driven shaft.

34. A spreader apparatus as set forth in claim 18 further including:
closure means co-operating with said outlet means for selectively closing said outlet means such that when said outlet means is closed by said closure means, the manure recirculates through said container, the arrangement being such that bridging is inhibited and also overflowing of manure from said container is avoided.

35. A spreader apparatus for spreading manure, said apparatus comprising:

a container defining an opening for the reception therein of the manure, said container also defining an outlet means for the discharge therethrough of the manure; a rotatable feed means disposed within and co-operating with said container for feeding the manure through said container, said feed means having an axis of rotation which extends through said container;

a rotatable discharge means disposed within said container and co-operating with said container and said feed means for moving manure towards said outlet means, said discharge means having a further axis of rotation which is disposed spaced and parallel to and laterally above said axis of rotation of said feed means, the arrangement being such that when said feed means and said discharge means are rotating, the manure is fed by said feed means from said feed means to said discharge even when the level of the manure drops below the top of said discharge means so that all of the manure within the container is fed at a substantially constant rate towards said outlet means; and expeller means disposed adjacent to said outlet means for expelling the manure from said container through said outlet means.

36. A spreader apparatus as set forth in claim 35 wherein said container includes:

a first and a second end zone, said outlet means being disposed substantially midway between said first and second end zones.

37. A spreader apparatus as set forth in claim 36 wherein said discharge means includes:

helical auger means for feeding the manure towards said outlet means; said auger means including:

a first portion for feeding the manure from said first end zone towards said outlet means;

a second portion for feeding the manure from said second end zone towards said outlet means.

38. A spreader apparatus as set forth in claim 35 wherein said outlet means includes:

an outlet and a further outlet;
said container including:

a first and second end zone, said outlet being disposed adjacent to said first end zone;

said further outlet being disposed adjacent to said second end zone.

39. A spreader apparatus as set forth in claim 38 wherein said discharge means includes:

helical auger means for feeding the manure towards said outlets;

said auger means including:

a first portion for feeding the manure towards said outlet;

a second portion for feeding the manure towards said further outlet.

40. A spreader apparatus as set forth in claim 38 further including:

a further expeller means disposed adjacent to said further outlet for expelling the manure from said container through said further outlet.

41. A spreader apparatus as set forth in claim 35 wherein said expeller means is positioned such that the manure moving through said outlet means is expelled by said expeller means laterally in opposite directions from said container so that when said apparatus moves between a first and a second row of trees disposed parallel relative to each other, the manure is expelled by said expeller means towards both rows of trees.

42. A spreader apparatus as set forth in claim 35 wherein said expeller means includes:

a driven shaft having an axis of rotation disposed substantially horizontally.

43. A spreader apparatus as set forth in claim 42 wherein said expeller means further includes:

a further driven shaft having a further rotational axis disposed substantially parallel to said axis of said driven shaft.

44. A spreader apparatus as set forth in claim 42 wherein said expeller means further includes:

a plurality of hammers, each hammer being pivotally secured to said driven shaft.

45. A spreader apparatus as set forth in claim 42 wherein said expeller further includes:

a plurality of fixed hammers, each hammer being rigidly secured to said driven shaft.

46. A spreader apparatus as set forth in claim 42 wherein said axis of rotation of said driven shaft extends angularly relative to said further axis.

47. A spreader apparatus as set forth in claim 42 wherein said axis of rotation of said driven shaft extends normally to said further axis.

48. A spreader apparatus as set forth in claim 42 wherein said axis of rotation of said driven shaft extends parallel to said further axis.

49. A spreader apparatus as set forth in claim 35 wherein said expeller means includes:

a driven shaft having a rotational axis disposed substantially vertically.

50. A spreader apparatus as set forth in claim 49 wherein said expeller means further includes:

a further driven shaft having a rotational axis disposed substantially parallel to said rotational axis of said driven shaft.

51. A spreader apparatus as set forth in claim 35 further including:

closure means co-operating with said outlet means for selectively closing said outlet means such that when said outlet means is closed by said closure means, the manure recirculates through said container, the arrangement being such that bridging is inhibited and also overflowing of manure from said container is avoided.

* * * * *